Patented Sept. 13, 1932

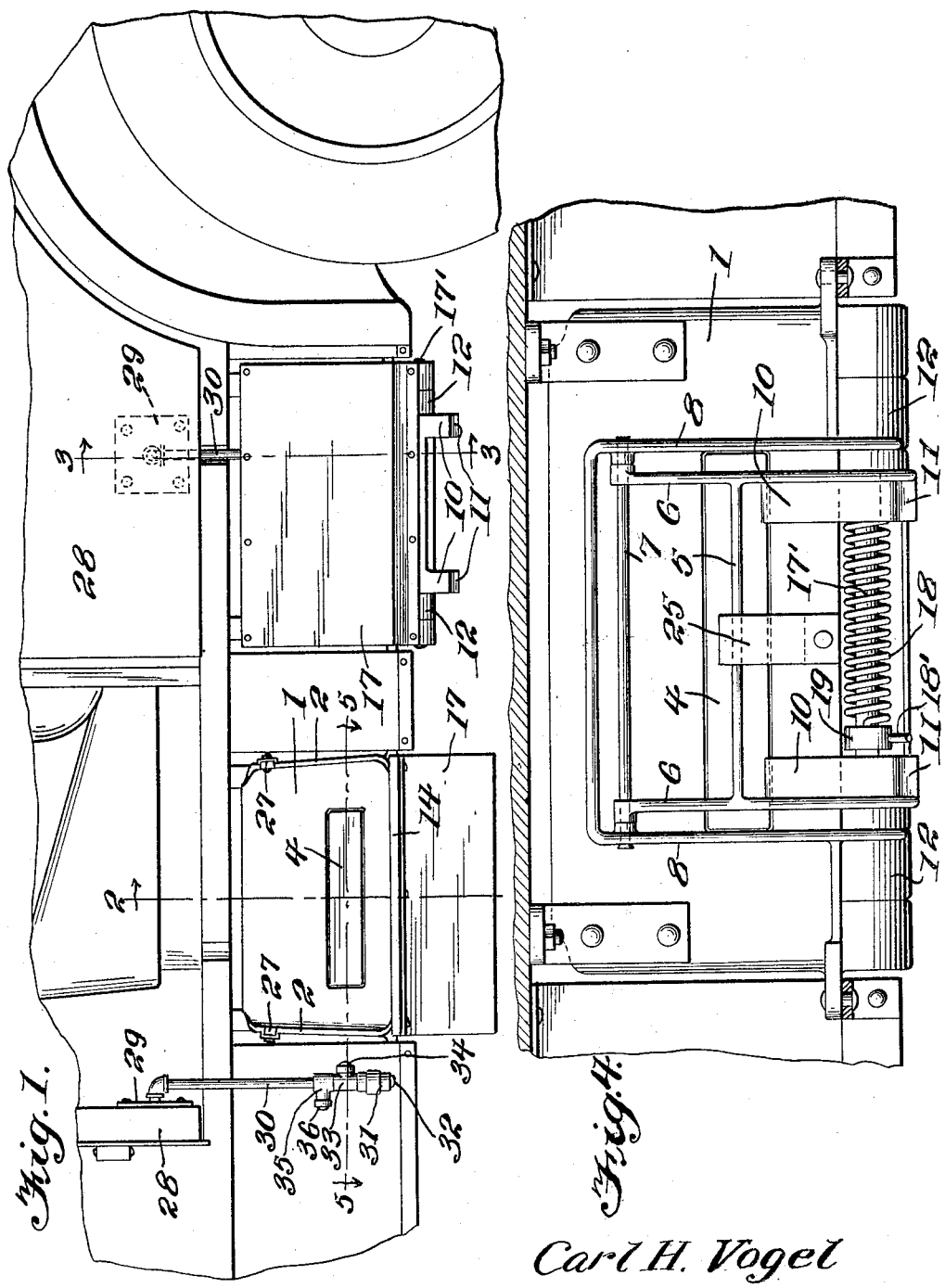

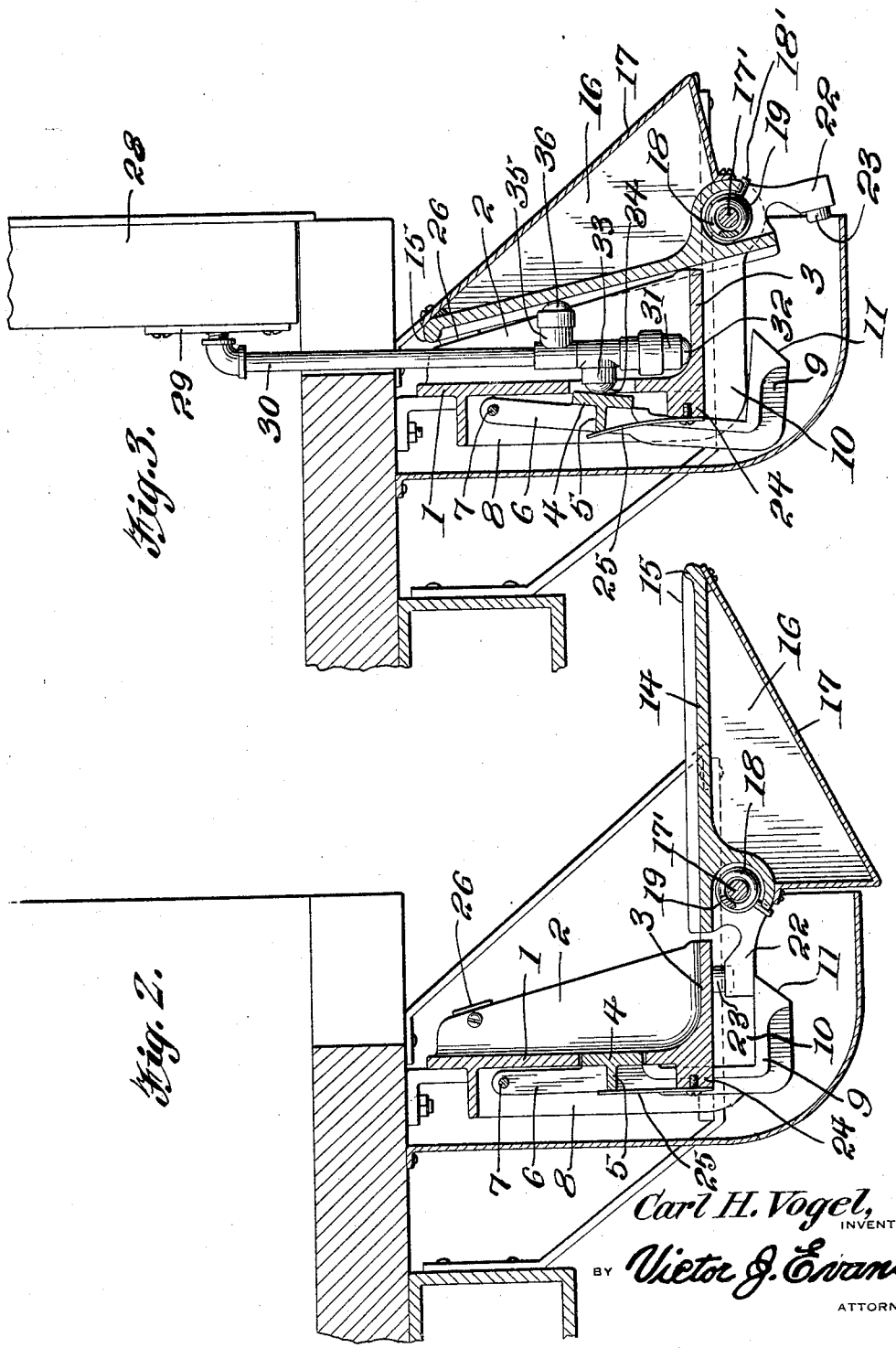

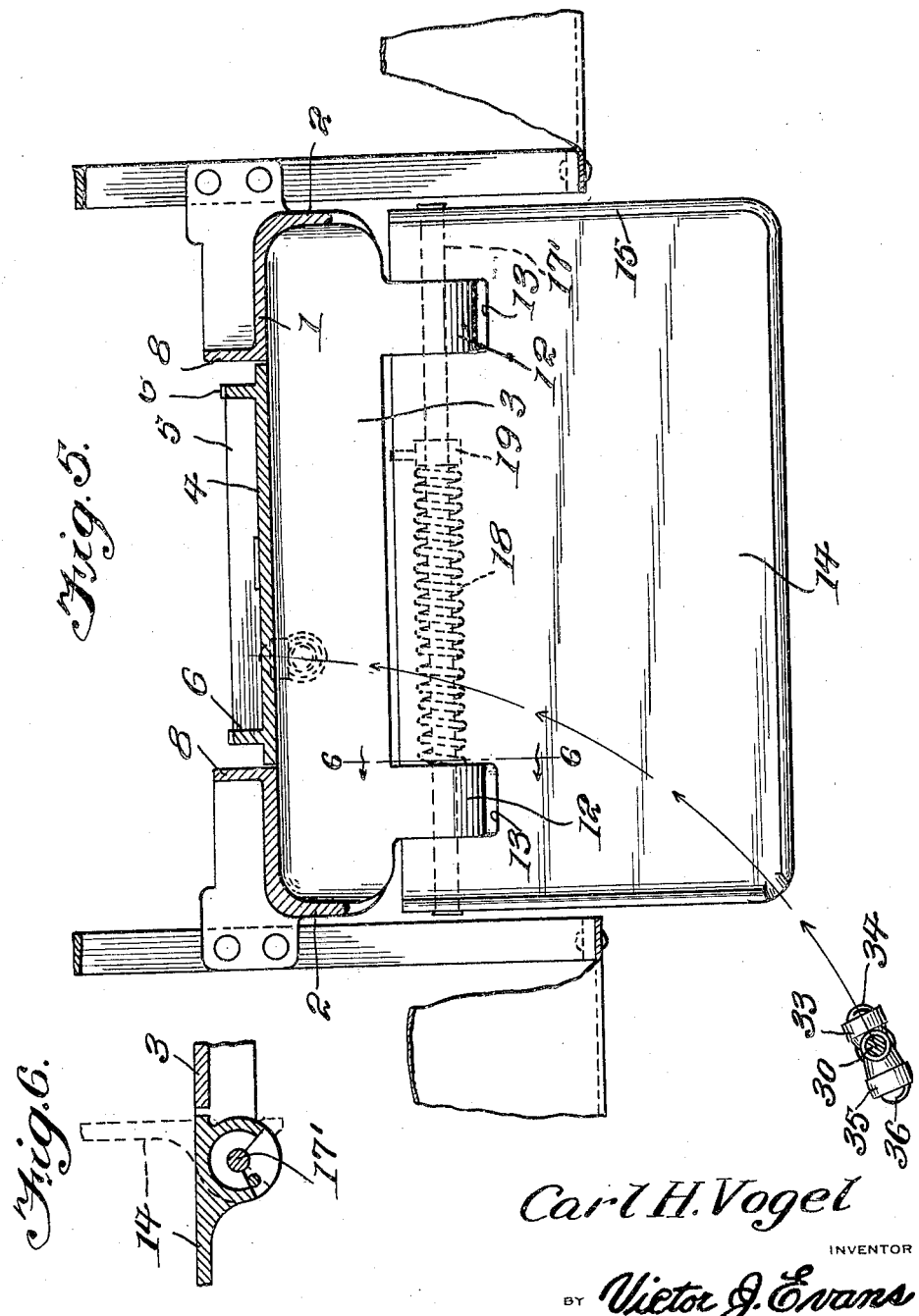

1,877,152

UNITED STATES PATENT OFFICE

CARL HENRY VOGEL, OF BUFFALO, NEW YORK

VEHICLE STEP

Application filed November 4, 1929, Serial No. 404,751. Renewed December 4, 1931.

My present invention has reference to vehicle steps, primarily designed for use upon automobiles, the main object being the provision of a foldable step which will dispense with the usual running board and which will be swung to open or horizontal position by the opening of the vehicle door and effectively latched in such position and further wherein the closing of the door will release the latch to permit of the step being folded to substantially vertical or inoperative position, and sustained by suitable means in such position so that the same cannot accidentally swing or move regardless of the vibration to which the vehicle is subjected.

A further object is to simplify and improve the construction upon which I have received U. S. Patents No. 1,604,861, granted Oct. 26, 1926 and No. 1,542,113, granted June 16, 1925.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.
In the drawings:

Figure 1 is a side elevation of a sufficient portion of an automobile to illustrate the application of my improvement thereon, one of the doors of the machine being swung to open position and one of the steps being swung to horizontal position.

Figure 2 is an enlarged sectional view on the line 2—2 of Figure 1.
Figure 3 is a sectional view approximately on the line 3—3 of Figure 1.

Figure 4 is a rear elevation of the improvement, the body of the vehicle being in section.
Figure 5 is an enlarged horizontal sectional view approximately on the line 5—5 of Figure 1.

Figure 6 is a detail sectional view on line 6—6 of Figure 5.

As previously stated my improvement is designed to dispense with the usual running board of an automobile or like vehicle and, therefore, I arrange each of my improved steps below each of the doors of the vehicle. The steps may be constructed of any desired metal having an inherent strength sufficient for my purpose and such metal is highly polished. The metal members constituting the improvement are in the nature of fasteners. The improvement essentially contemplates a metal riser 1, that has side flanges 2 and a bottom flange 3. The riser is rigidly and effectively secured to the bottom of the automobile directly below the door thereof and the said riser is suitably braced, as disclosed by the drawings. The riser, at the center thereof, is provided with a substantially rectangular opening for the reception of a plate 4 formed on the end of a web 5 that is integral with vertical disposed arms 6 which are pivoted, as at 7, to the rear side flanges 8 of the riser 1. The lower ends of the arms 6 are extended a suitable distance below the bottom 3 of the riser, and are arranged between the lower and outwardly extending ribbed flanges or arms 9 that reinforce the bottom 3 of the riser. The ends of these arms 6 are formed with outwardly extending angle and widened portions 10 that provide hooks, the outer edges of the said hooks being beveled or inclined, as at 11. The floor 3 of the riser 1, at suitable points adjacent to the ends thereof are formed with outwardly extending arms whose outer portions are cross sectionally rounded. These portions are indicated by the numeral 12 and are designed to be received through slots 13 that enter from the inner edge of the step 14. The plate comprising the step 14 is of substantially rectangular formation and has its upper face dished, or in other words the side and outer edges thereof are formed with slightly upturned flanges 15. The inner face of the step 14 preferably has side flanges 16 whose outer edges are inclined, and secured to the edge of the said flanges there is a protective shield 17. The shield not only contacts with the inclined edges of the flanges but with the under and widened edges of such flanges, and this shield effectively prevents the entrance of moisture to the step when the latter is in raised position. It should be stated that the outer edges of the side flanges 2 of the riser 1 are inclined inwardly from the bottom to the top thereof.

There is passed through suitable bearing openings in the bottom of the step and through the elements 12 a shaft 17'. Around this shaft there is arranged a coil spring 18. The spring has one of its ends secured by means such as a collar 19 on the shaft and the tendency of the spring is to swing the step to its upper and closed position.

There is integrally formed on the bottom of the step rearwardly extending lugs 22. These lugs have cup-shaped depressions for the reception of rubber bumpers 23 which are designed to contact with the under face of the bottom 3 of the riser, when the step is in open position, and likewise these lugs are designed to be engaged by the hooks 10 and to rest on the arms 9 for effectively holding the step in its lower horizontal position and in parallelism with the upper face of the bottom 3 of the riser. The plate 4 is in the nature of a locking element as the same is snugly received through the opening in the riser 1 and is influenced into this opening through the medium of a leaf spring 25 which contacts with the web 5 on the rear face of the said plate 4 and the spring 25 has its lower end fixedly secured to a rearwardly extending reinforcing rib 24 on the riser 1. The plate being sustained by the spring 25 in the opening in the riser 1 therefore will hold the arms 9 beneath the lugs 22 and thereby sustain the upper face of the step 14 flush with the lower face 3 of the riser 1. This member 4 is designed to be contacted in a manner hereinafter to be described to force the same rearwardly and to swing the angle elements 10 and what I have termed the hooks on the arms 6 out of engagement with the lugs 22, when the step is brought to closed position.

The rear face of the riser 1, through which the shaft that provides the pivot 7 for the hook carrying arms 6 passes, is formed with a rearwardly extending reinforcing rib 24 whose sides afford the bearings for the said shaft, and which contacts with the rear face of the plate 4 to normally swing the arms to cause the hooked ends thereof to engage with the lugs 22.

The upper edges at one of the corners of each of the inclined side flanges 2 of the riser are provided with buffer members 26 to resist the jar incident to the step swinging thereagainst, and one or each of the said corners of the flanges 2 has arranged thereon a spring catch 27 for contacting with the outer face or rather the protective shield 14 for the step when the said step is in raised or inoperative position.

On each of the doors 28 of the vehicle there is fixed a bracket plate 29 that has screwed on a lug thereon a coupling for a depending pipe member or rod 30. The rod or pipe has a lower socket 31 in which is mounted for rotation a sphere 32 and this sphere or metal ball is in contact with the upper face of the bottom 3 of the riser 1, when the step is closed. The pipe or rod 31 has another rearwardly directed socket 33 for an outwardly projecting sphere or metal ball 34 that is in the path of contact with the plate 4 formed on the hook carrying arm 6. Above the socket 33 the rod or pipe 30 is provided with an additional socket 35 in which is mounted an outwardly projecting revoluble metal sphere 36 that is in contact with the top face of the step. It will be apparent that when the door is swung to open position the sphere 36 contacting therewith will cause the same to be swung outwardly and downwardly against the pressure of the coil spring. This movement of the door releases the contacting engagement of the sphere 34 with the plate 4 so that the hooks on the arms 9 will be brought beneath the lugs 21 when the plate step 14 is swung to horizontal position. After the door assumes a determined angle the sphere 36 will be brought out of contact therewith and the sphere 32 will ride over the upper face of the plate step to cause the same to assume the proper horizontal position for alinement with the bottom 3 of the riser 1 or to have its lugs 22 engaged by the hooks 10. When the door 28 is closed the sphere 30 will ride over the top of the step and likewise over the top of the lower element or flange 3 of the riser 1 and the sphere 34 will be brought into contact with the plate 4 to swing the hook carrying arms rearwardly to cause the hooks 10 thereon to be brought out of engagement with the lugs 22 thereby releasing the said step to permit of the coil spring swinging the same to closed position when the same will be engaged by the catch elements on the flanges 2 and effectively held in such closed position.

It is, of course, to be understood that the notch in the corner of the step is not an absolute requirement as the member 30 can travel over the slight flange 15 on the step 14. The fender 17, if desired, may be also dispensed with, but the same adds to the ornamentality of the construction. The fender is fastened to the outer face of the plate 14 and, of course, corresponds in shape to that of the step. One end of the spring 18 is preferably passed through a substantially semi-cylindrical opening in the collar 19 and affords a finger extension 18'. The finger, of course, may be formed on the collar. The finger passes through a substantially semi-cylindrical opening in the plate step 14 and is received in a notch in the end of the rounded depression or concavity provided at the inner end of the step 14 through which the shaft 17' passes and thereby exerts a pressure against the step 14, while the other end of the coil spring is received in a notch in one of the portions 12 of the flange 3 of the riser 1. This arrangement serves to tune up the pressure of the spring when the step is swung to active or inactive position. The step, of course, swings only one-fourth of a revolution during the operation thereof. The spring 25 is fastened to the top braces, at the rear of the bottom 3 for the riser 1 and provides one of the lug extensions as far as the side flanges (braces) reach down and are fastened by the castings to the pattern. The spring plate for the hooks is secured in such way that the springs have more strength. The rear side is closed by the metal sheet plate 50 to protect the parts against mud and dirt and the said sheet is covered only from the bend of the flange to the hinges it protects. Thus the polished part of the step plate 14, which is visible from the rear, when the step is closed may be the metal sheet which reaches up to the top flange. By this arrangement it will be noted that the improvement provides the side or running board of the machine.

The simplicity and advantages of my improvement will, it is thought, be understood and appreciated by those skilled in the art to which such invention relates so that further detailed description will not be required.

As my improvement is preferably constructed of aluminum or some light material the parts thereof which are subject to wear are reinforced by hardened metal members such as steel or the like.

Having described the invention, I claim:

1. A step designed to be supported between the door of an automobile or like vehicle in which said door opens outwardly and has a depending element thereon, said step including a riser, pivotally supported spring influenced hooks on the riser, a step pivotally secured to the riser and spring influenced to swing thereagainst and to receive the element depending from the door between the step and riser, lugs on the step to be engaged by the hooks when the step is closed, catch means for holding the step closed, said hook designed to be swung to release position by contact with the depending element on the door, the step designed also to be swung to open position by contact with the said element to release the hooks and to permit of the latter engaging the lugs on the door for holding the step in open position.

2. A step designed to be arranged beneath the outwardly swinging door of an automobile or like vehicle, including a riser, spring influenced arms pivotally secured to the rear of the riser and having the lower ends offset outwardly to provide hooks, a connecting element for the arms received through an opening in the face of the riser, a spring influenced step normally closed against the riser and having lugs thereon to engage with the hooks, catch means for holding the step in such position, a depending element on the door having anti-frictional elements in the path of contact with the face of the step, the bottom thereof and with the connecting element of the arms for swinging the arms to bring the hooks out of engagement with the lugs of the step when the step is folded and likewise designed to contact with the step to swing the same to open position to release the hooks and to permit of the same engaging beneath the lugs for holding the step in open position.

3. A step designed to be arranged beneath the outwardly swinging door of an automobile or like vehicle, including a riser, spring influenced arms pivotally secured to the rear of the riser and having the lower ends offset outwardly to provide hooks, a connecting element for the arms received through an opening in the face of the riser, a spring influenced step normally closed against the riser and having lugs thereon to engage with the hooks, catch means for holding the step in such position, a depending element on the door having anti-frictional elements in the path of contact with the face of the step, the bottom thereof and with the connecting element of the arms for swinging the arms to bring the hooks out of engagement with the lugs of the step when the step is folded and likewise designed to contact with the step to swing the same to open position to release the hooks and to permit of the same engaging beneath the lugs for holding the step in open position and an angularly arranged protective outer facing for the step.

4. A step designed to be arranged beneath the outwardly swinging door of an automobile or like vehicle, including a riser, spring influenced arms pivotally secured to the rear of the riser and having the lower ends offset outwardly to provide hooks, a connecting element for the arms received through an opening in the face of the riser, a spring influenced step normally closed against the riser and having lugs thereon to engage with the hooks, catch means for holding the step in such position, a depending element on the door having anti-frictional elements in the path of contact with the face of the step, the bottom thereof and with the connecting element of the arms for swinging the arms to bring the hooks out of engagement with the lugs of the step when the step is folded and likewise designed to contact with the step to swing the same to open position to release the hooks and to permit of the same engaging beneath the lugs for holding the step in open position and an angularly arranged protective outer facing for the step, compressible bumpers between the step and riser and compressible bumpers between the lugs of the step.

5. A foldable step designed to be arranged beneath an outwardly opening door of an automobile or the like, including a riser which is fixed to the bottom of the automobile, and which has a lower outwardly extending portion and outer sides and rear flanges, the outer flanges having their edges arranged at an inclination, buffer elements thereon, catch elements also on said flanges, a pair of arms pivotally secured to the rear flanges of the riser, outwardly extending hooks carried by the arms, spring means for influencing the arms against the riser, a connecting element for the arms received through an opening in the face of the riser, a step having the edges on the face portions thereof flanged, and which is pivotally secured to the lower portion of the riser and spring influenced to close against the riser, lugs on the steps to be engaged by the hooks on the arms, compressible elements on the lugs, side flanges on the outer face of the step which are arranged at an inclination, a protective plate secured on said flanges, an element secured to and depending from the door received between the step and riser and having frictional elements thereon to contact respectively with the inner face of the step, when the latter is closed, with the bottom of the riser and with the face of the step and with the connecting element for the hook carrying arms, for the purpose set forth, and the catches on the side flanges of the riser designed to engage with the step when the latter is in closed position.

In testimony whereof I affix my signature.

CARL HENRY VOGEL.